United States Patent Office 2,983,717
Patented May 9, 1961

2,983,717
POLYMERIZATION PROCESS FOR WATER-SOLUBLE POLYMERS

Ernest J. Henley, New York, N.Y., and Robert C. Bell, Stamford, Conn., assignors to American Cyanamid Company, New York, N.Y., a corporation of Maine No Drawing. Filed July 25, 1957, Ser. No. 674,037

10 Claims. (Cl. 260—80.3)

The present invention relates to the preparation of a relatively high molecular weight polymeric material. More particularly, the invention relates to a novel method of polymerizing acrylamide with a high conversion of monomer to polymer. By the present invention, a viscous reaction mass which is difficult or impossible to agitate may be treated and catalytically activated to the point in which substantially all monomer is polymerized.

The present invention has particular application to water-soluble monomeric material, such as acrylamide which is also water-soluble in its polymerized form. In addition to acrylamide, other water-soluble monomers, which form water-soluble polymers, such as methacrylamide, acrylic acid, methacrylic acid and the like may be employed in practicing the present invention. It is necessary that the monomeric, as well as the polymeric material derived therefrom, be water-soluble. The nature of the invention will be more particularly set forth with reference to the polymerization of acrylamide which is the preferred material, although other water-soluble compounds may be employed.

In making relatively high molecular weight polymers of acrylamide, it is necessary, in order to fully convert substantially all monomer in the viscous mass to polymer within a reasonable length of time, to add an additional or "booster" amount of catalyst at an advanced stage in the polymerization. The effect of the delayed addition of more initiator is to continue conversion of monomer in the partially polymerized mass to substantial completion providing a good dispersion of the "booster" catalyst in the mass is obtained. The addition of a greater amount of catalyst which provides a large and simultaneous source of free radicals early in the polymerization to attempt more complete conversion is disadvantageous due to the fact that immediate availability of a large source of free radicals results in the formation of a correspondingly greater number of polymer chains which consequently produce a lower molecular weight product.

In the prior methods, dispersing of the "booster" amount of catalyst into the partially polymerized mass has presented a serious difficulty due to the high viscosity, i.e. the heavy gel stage, of the reaction mass at the time when the additional booster amount is desired. Accordingly, a uniform distribution of the catalyst at this advanced stage is almost impossible, particularly with higher concentrations, as for example where the initial monomer concentration exceeds about 5% particularly in the solution polymerization of acrylamide.

According to the method of the present invention, we have discovered that it is possible to obtain high molecular weight polymers by introducing into the solution of the monomer a uniform dispersion of a multi-component catalyst system. The catalyst system is so selected that all of the catalyst is introduced prior to the polymerization although a component of the system remains inactive or latent at the initial polymerization temperature, although uniformly distributed throughout the reacting mass. In a more specific aspect where the polymerization is conducted adiabatically, at an advanced stage in the polymerization, i.e. at a higher temperature, the latent component of the catalyst system is self-activated and promotes polymerization of the residual monomeric material. When adiabatic polymerization is not used, the temperature may be controlled so that the "booster" catalyst is timely activated. By the use of the procedure of the invention, it is possible to polymerize higher concentrations of monomer because the need to stir or agitate the catalyst into the viscous mass is obviated.

It is an object of the present invention to prepare a high molecular weight polyacrylamide by a process in which the activator is introduced in one stage but polymerization is catalytically activated in more than one stage.

It is a further object of the present invention to obtain substantially complete polymerization of residual monomer in a highly viscous mass which cannot be agitated.

It is a further and more specific object of the present invention to prepare high molecular weight polyacrylamide by adiabatic process wherein the exotherm is employed to activate a catalyst component to promote polymerization of residual monomer in the polymerizing mass. Other objects will be apparent as the description of the invention proceeds.

According to the present invention, a relatively high molecular weight polymer and substantially complete conversion of all the monomeric material is obtainable by introducing a single multicomponent catalyst system at the beginning of the polymerization, i.e. at a time when the polymerizable material is relatively nonviscous and intimate distribution of the catalyst uniformly throughout the polymerizable material presents no problem. The catalyst system employed is in effect one which behaves as a two-stage activator; an initial stage to start the polymerization, and a secondary stage wherein the viscous partially polymerized material is again activated to effect substantially complete conversion of the remaining monomeric material. The uniform distribution of the catalyst performed at the beginning is, of course, maintained throughout the polymerization including those stages wherein it is impossible to stir the reaction mass. It is known that at these later stages, even though the material be extremely viscous, that substantial quantities of residual monomer are present in the mass. The presence of unreacted monomer has various disadvantages including a lower molecular weight and the toxicity potential of the monomer in its unpolymerized state, for example. By activating the latent component of the catalyst system at this later stage, the polymerization of the residual monomeric material in the mass can be greatly facilitated and accelerated. By use of the present method, it is possible to use higher concentrations of monomer and to obtain a high molecular weight polymer while circumventing the most difficult problem of introducing the catalyst into the partially polymerized viscous mass.

The polymerization reaction is known to be exothermic. By utilizing the exotherm from the reaction, we have discovered that it is possible to select a catalyst component which will become activated by the exotherm at an appropriate stage in the polymerization to continue the polymerization to a stage of substantially complete conversion of the monomer. The polymerization reaction of the present invention is particularly suitable for batch procedure wherein the whole of the catalyst system is mixed with the polymeric material and the batch is permitted to polymerize to substantially complete conversion without further agitation, additions or treatment.

The polyacrylamide prepared by the process of the invention has a molecular weight in excess of about 1,500,000 and generally an average molecular weight in excess of two million, and has excellent properties in various applications, such as a flocculant in settling ore slimes, as a thickening agent, in adhesives, in coating compositions and for textile treatments, for example.

As the polymerization initiators in the present invention, redox catalyst systems are employed. In order to facilitate the description of the procedure employed in the present invention, the redox catalyst system will be considered as two separate components. The oxidizing component will be referred to as A and the reducing component as B. We have discovered that when these two components of the redox catalyst are employed in approximately stoichiometric amounts, designated as AB, as the initiator for the first stage, the polymerization reaction is initiated and proceeds very favorably at comparatively low temperatures, i.e. at about 45–50° C. As the latent, or second stage initiator, which is employed to carry the reacting material to substantially complete conversion, an additional quantity of the oxidizing component designated as A' is used. This additional amount A', i.e. the second stage catalyst, is employed in amounts exceeding the stoichiometric equivalent of the reducing component by at least about 50%. It will be understood that the whole quantity of AB plus A' is added at the beginning when the low viscosity of the monomer solution permits easy and uniform dispersion of the catalyst throughout the reaction mass. We have discovered that the components A and B used in stoichiometric equivalents AB initiate the polymerization at the lower temperature and the additional portion A', of the oxidizing components, which will not decompose appreciably until the temperature exceeds about 65° C. promotes and carries the polymerization to substantial completion at the more advanced stage of the polymerization.

It will be apparent that the present invention avoids the use of an excessive amount of catalyst at the beginning of the reaction thus obviating the adverse effect on molecular weight of a large number of free radicals at the start of the polymerization. Furthermore, the invention supplies the additional catalyst at the highly gelled intermediate stage when further activation is most beneficial.

Suitable oxidizing components A of the redox systems are such of the inorganic peracid salts as do not decompose rapidly under 65° C., e.g. ammonium, sodium and potassium persulfates, and perdisulfates, sodium and potassium perborates, and the like. Examples of suitable reducing components B are such as the sulfites, bisulfites, hydrosulfites, thiosulfites, e.g. sodium and potassium sulfites, bisulfites, hydrosulfites, and thiosulfites; sulfurous acid, ethyl and other alkyl sulfites and the like.

The amount of catalyst used may be varied widely depending, for example, upon the particular kind of catalyst used and other polymerization conditions, and may range, for instance, from about 0.001% to about 0.5% or even as high as 1.0% or more by weight of the total amount of the acrylamide or its derivative employed. Generally, the amount of each component of the catalyst system is within the range of about 0.005% to about 0.3 or 0.4% by weight of the total monomers. In order to provide control of the molecular weight of the polymer in the range of about 1.5 million to 3.0 million, the amount of first stage catalyst should not be used excessively. However, the use of larger amounts of the second stage activator with respect to the redox catalyst is not precluded, e.g., 2 or 3 more mols of second stage activator A' or more may be used under conditions where it is difficult to obtain high conversion.

The polymerization reaction is preferably effected while the aqueous medium is maintained under an atmosphere of an inert gas, such as for example, nitrogen, helium, carbon dioxide and the like, in view of the inhibiting effect of oxygen of the atmosphere on the reducing component of the catalyst system.

In certain instances, it may be desirable to incorporate other and significantly water-insoluble monomeric materials into the reaction zone in order to form copolymers with the water-soluble monomers. In the event that such other monomers are copolymerized with the acrylamide to produce a polymeric composition to fit the desired needs, it is necessary that the amount utilized be such that the monomer employed have some solubility in water and that the water-soluble characteristic of polyacrylamide remains substantially unaltered. For example, acrylonitrile which has a solubility in water of about 7% may be employed. Examples of comonomeric materials that may be used herein in addition to acrylonitrile are such as methyl acrylate, methyl methacrylate, methacrylamide, acrylic acid, sodium acrylate, diallylamine, allylamine, vinyl pyridine, vinyl pyridinium chloride, diallyl dimethylammonium chloride and the like.

Amounts of these comonomeric materials should not exceed 25% of the total weight of the monomers and preferably not in excess of 20%, i.e. the water-soluble monomer should comprise at least 75% and preferably 80% of the monomeric material.

The polymeric materials prepared in accordance with our invention is a substantially clear infinitely water-soluble product. They have been found suitable and superior in many instances for various known applications, in addition to those hereinbefore specified. Suitable additional uses are such as those disclosed for polyacrylamide in the New Product Bulletin of American Cyanamid Company, 30 Rockefeller Plaza, New York, entitled Polyacrylamide, published in June 1955. The polymeric product of the present invention may also be insolubilized by techniques and use of suitable agents such as formaldehyde or methylenebisacrylamide for example.

As heretofore mentioned, the process of the invention may be advantageous when conducted adiabatically i.e. the exotherm of the reaction is utilized to activate the latent catalyst component for the second stage of the polymerization. As a monomer concentration of approximately 8% under adiabatic conditions, initiated at approximately 45° C., experiences a rise to about 72° C., initiating the latent catalyst at about 65° C., it will be apparent that the present invention provides a greatly simplified and economic procedure. After the catalyst has been mixed with the monomer and the polymerization reaction is initiated, no further additions, mixing or heat exchange is required for the reaction.

Accordingly, by introducing a redox catalyst, in which the components are used in approximately stoichiometric amounts AB to initiate the polymerization at approximately 45° C. and introducing at the same time added quantities comprising A' about 0.5 to four times the amount of the oxidizing component A used in the first stage, a highly useful technique is available. Use of the component A alone is ineffective at temperatures below about 65° C.

In the procedure employed, the whole of the catalyst and activator are introduced into the polymerizable material at the early stages, preferably at the beginning of the polymerization. The redox catalyst starts the reaction which is exothermic and consequently as the polymerization progresses the temperature rises from an initiating temperature of about 45° C. to about 72° C., effectively beyond the point of about 65° C. at which the additional amount of initiator A' is activated and carries the reaction to completion.

We have found that redox catalyst alone or any other single-addition catalyst does not carry the reaction to the same degree of completion nor provide a polymer with the desired properties.

In order that the invention may be more fully understood, the following examples are presented for purposes of illustration only and the specific enumeration of detail should not be interpreted as a limitation except as expressed in the appended claims.

Example 1

Into a suitable stainless steel reaction vessel equipped with an agitator for dissolving the monomer in water are introduced 917 parts of deionized water and 60 parts of acrylamide. The system is purged with carbon dioxide which is maintained throughout the reaction. A total of 0.10% potassium persulfate and 0.02% potassium metabisulfite based on the weight of monomer are added. This amount of potassium persulfate equals the stoichiometric equivalent amount for the potassium bisulfite as well as an additional amount of 0.05% based on the weight of monomer which is effective as the second stage catalyst. The catalyst and monomer are well mixed and the reaction temperature is brought to about 45% C. Thereafter, the system is allowed to react adiabatically. At the end of a three-hour period, the product is substantially colorless with a very slight haze and free from soluble granules. The intrinsic viscosity of the product in 1 N sodium nitrate at 30° is 6 ± 0.2. The product has a molecular weight of between 2.5 and 3 million. Conversion of monomer to polymer is 99.6%.

It will be apparent that in the foregoing procedure, the first and second stage catalyst components may be added all at the same time to the monomer at the beginning of the reaction, or the addition of catalyst may be made in increments at the earlier stages in the polymerization when the viscosity of the polymerizing mass is no problem in effecting a good dispersion of the catalyst through the reaction mass.

As a matter of convenience, it is generally preferable to introduce the catalyst as an aqueous solution. In any event, once the catalyst has been well mixed into the polymerizable material, no further agitation or mixture of the mass is required.

Example 2

The procedure of Example 1 is substantially repeated with the exception that the procedure is conducted in a semicontinuous manner, i.e. the monomer and catalyst are fed alternately into reaction vessels in series referred to as Vessel No. 1 and Vessel No. 2.

After the monomer is introduced into the water of reaction Vessel No. 1 in the manner described in Example 1, a solution containing all the catalyst is introduced steadily and the mixture is stirred fairly rapidly. The temperature of the mixture is raised to about 45° C. In about ten minutes, when the reaction has started but before any significant increases in viscosity has occurred, the mixture is poured into reaction Vessel No. 2, which is insulated, and the system is permitted to react adiabatically. At about 65° C. when the booster quantity of catalyst is activated, a slight rise in temperature is noted. In three hours, the material is allowed to flow out of the bottom of the reaction Vessel No. 2. The next batch previously mixed in the Vessel No. 1 is introduced into Vessel No. 2 as soon as the fully polymerized material is evacuated from this vessel. The material of the next batch is then polymerized adiabatically in the manner described. The properties of the product obtained are substantially identical to those of the product of Example 1, having a molecular weight in excess of two million.

Example 3

100 parts of monomeric acrylamide are charged into a suitable adiabatic reaction vessel equipped with stirrer containing sufficient deionized water to make an 8% aqueous acrylamide solution. The solution is heated to a temperature of between 55 and 58° C. while it is purged with nitrogen. A fresh catalyst solution comprising a total of .06 part of potassium persulfate (the stoichiometric quantity of about 0.038 part plus an additional amount of about 0.022 part) and 0.015 part of potassium metabisulfite are charged into the vessel and mixed thoroughly. The reaction vessel is sealed and polymerization is allowed to continue. The mass exothermed to a temperature of 73 ± 3° C. in a period of about 35 minutes. Reaction is allowed to continue for 7 hours. The product upon analysis shows a conversion of 99.7% and has a Brookfield viscosity of a 2% solution at 25° of 900 centipoises.

Example 4

The procedure of Example 3 is substantially repeated with the exception that the deionized water is preheated to a temperature such that the mixture of water, monomer and catalyst has a temperature of 55° C. and the monomer is fed in a 40% solution in amounts sufficient to make an 8% monomer solution together with an aqueous solution containing a total of .06 part potassium persulfate (0.03 part stoichiometric quantity and 0.03 part in addition) and .012 part potassium metabisulfite, together with a constant stream of nitrogen. The feed rates are adjusted so that the reaction vessel is filled in about 7 hours. About 30 minutes after starting the feed, the reaction commences and rises to 71° C. The material at the bottom of the reaction vessel is sampled 7 hours after starting and is found to be greater than 99% converted as determined by iodine number determination. The product as recovered has a Brookfield viscosity at 25° C. of 1100 centipoises.

Example 5

Into a suitable stainless steel, jacketed kettle equipped with an agitator for dissolving the monomers in water, are introduced 85 parts of deionized water, 12 parts of acrylamide and 3 parts of acrylic acid. A total of 0.09% potassium persulfate and 0.036% potassium sulfite based on the total weight of monomers is added. This amount of potassium persulfate equals the stoichiometric equivalent amount (0.05%) as well as an additional amount of 0.04%, based on the weight of monomers, which is effective as a second stage catalyst. The reactants are heated to 50° C. and one part of Dry Ice is added to the mixture. The reaction starts within 25 minutes and 40 minutes after the reaction starts the temperature has risen to 80° C. By use of the reactor jacket the temperature is held at about 80° C. for a total of 6 hours. At this point the polymer has a Brookfield viscosity of 2,000 centipoises measured in a 5% solution at 25° C. The conversion of monomer to polymer, as measured by iodine number is 99.5%.

The foregoing description has been provided for purposes of illustration and not limitation. The invention is not to be limited to the exact details disclosed and described due to the fact that obvious modifications will occur to those skilled in the art.

We claim:

1. A method of preparing water-soluble polymers which comprises polymerizing in aqueous solution monomeric material selected from the group consisting of acrylamide, methacrylamide, acrylic acid and methacrylic acid and water-soluble mixtures thereof with not more than 25% of a monoethylenically unsaturated monomer copolymerizable therewith by dispersing into said aqueous solution of monomeric material from about 0.001 to about 0.5% of a redox catalyst, the oxidizing component A and the reducing component B of said catalyst being present in approximately stoichiometrically equivalent amounts; and additionally dispersing in said solution an amount of between about 0.5 to 4 times the amount of said redox catalyst, of the oxidizing component A but no further amount of the reducing component B; said A component having a polymerization activation temperature higher than the stoichiometrically equivalent fraction of said catalyst which combines with B, thereby being activated at an advanced stage of the polymerization reaction; and effecting polymerization of said monomeric material with no additional amounts of catalyst by initiating the polymerization at a temperature between about 35° C. and 55° C. and completing the advanced stage of the polymerization at a temperature higher than about 65° C.

2. The method of claim 1 wherein said material is acrylamide.

3. The method of claim 1 wherein said material is methacrylamide.

4. The method of claim 1 wherein said material is acrylic acid.

5. The method of claim 1 wherein said material is methacrylic acid.

6. A method of preparing polyacrylamide comprising dispersing into an aqueous solution of acrylamide from about 0.001 to about 0.5% of a redox catalyst, the oxidizing component A and the reducing component B of said catalyst being present in approximately stoichiometrically equivalent amounts and additionally dispersing in said solution an amount of between about 0.5 to four times the amount of said redox catalyst, of the oxidizing component A but no further amount of the reducing component B; said A component having a polymerization activation temperature higher than 65° C. thereby being activated at an advanced stage of the polymerization reaction, and effecting polymerization of said acrylamide with no additional amounts of catalyst by initiating the polymerization at a temperature of between about 35° C. and 55° C. and completing the advanced stage of the polymerization at a temperature higher than about 65° C.

7. A method of preparing a copolymer of acrylamide and acrylic acid comprising dispersing into an aqueous solution of these monomers from about 0.001 to about 0.5% of a redox catalyst, the oxidizing component A and the reducing component B of said catalyst being present in approximately stoichiometrically equivalent amounts and additionally dispersing in said solution an amount of between about 0.5 to four times the amount of said redox catalyst, of the oxidizing component A but no further amount of the reducing component B; said A component having a polymerization activation temperature higher than 65° C. thereby being activated at an advanced stage of the polymerization reaction, and effecting polymerization of said monomers with no additional amounts of catalyst by initiating the polymerization at a temperature of between about 35° C. and 55° C. and completing the advanced stage of the polymerization at a temperature higher than about 65° C.

8. A method of preparing polyacrylamide comprising dispersing into an aqueous solution containing acrylamide monomer in concentrations of at least about 5%, from about 0.001% to about 0.5% of a redox catalyst, the oxidizing component A and the reducing component B of said catalyst being present in approximately stoichiometrically equivalent amounts; and additionally dispersing into said solution an amount of between about 0.5 to four times the amount of said redox catalyst, of the oxidizing component A but no further amount of the reducing component B; said A component having a polymerization activation temperature higher than 65° C. thereby being activated at an advanced stage of the polymerization reaction; and effecting adiabatic polymerization of said acrylamide with no additional amounts of catalyst by initiating the polymerization at a temperature of between about 35° C. and 55° C. and completing the advanced stage of the polymerization at a temperature exceeding about 65° C., said higher temperature resulting solely from the heat of exotherm of the reaction.

9. A method of preparing polyacrylamide comprising dispersing into an aqueous solution containing at least about 5% acrylamide, from about 0.001 to about 0.5% of a persulfate-bisulfite catalyst, the persulfate component A and the bisulfite component B of said catalyst being present in approximately stoichiometrically equivalent amounts and additionally dispersing in said solution an amount of between about 0.5 to four times the amount of said persulfate-bisulfite catalyst of the persulfate component A but no further amount of B; said persulfate component having a polymerization activation temperature higher than 65° C. thereby being activated at an advanced stage of the polymerization reaction and effecting adiabatic polymerization of said acrylamide with no additional amounts of catalyst by initiating the polymerization at a temperature of between about 35° C. and 55° C. and completing the advanced stage of the polymerization at a temperature exceeding about 65° C., said higher temperature resulting solely from the heat of exotherm of the reaction.

10. The process of claim 9 wherein the catalyst component A is potassium persulfate and the catalyst component B is potassium metabisulfite.

References Cited in the file of this patent

UNITED STATES PATENTS

| | | |
|---|---|---|
| 2,631,995 | Bruson | Mar. 17, 1953 |
| 2,649,438 | Bruson | Aug. 18, 1953 |
| 2,727,016 | Hankins et al. | Dec. 13, 1955 |
| 2,801,985 | Roth | Aug. 6, 1957 |